May 30, 1939. C. A. FRISCHE 2,160,066
SOUNDPROOFING CONSTRUCTION
Filed Nov. 16, 1935
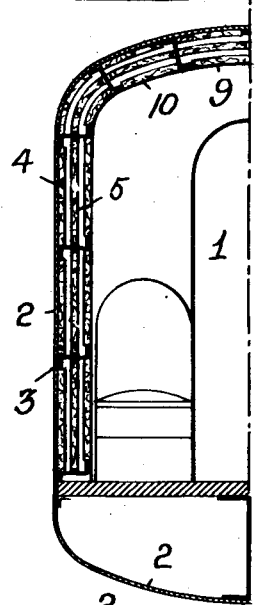
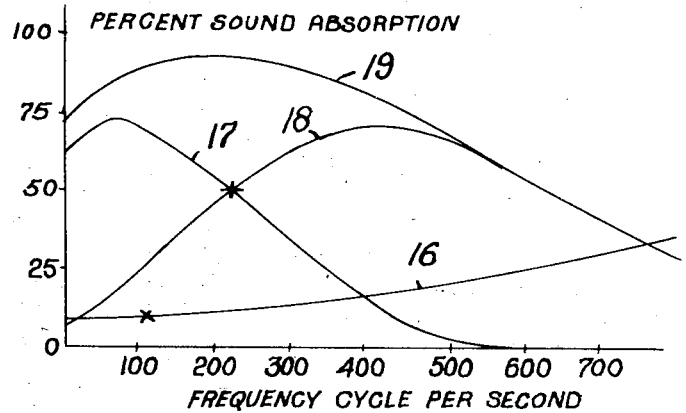
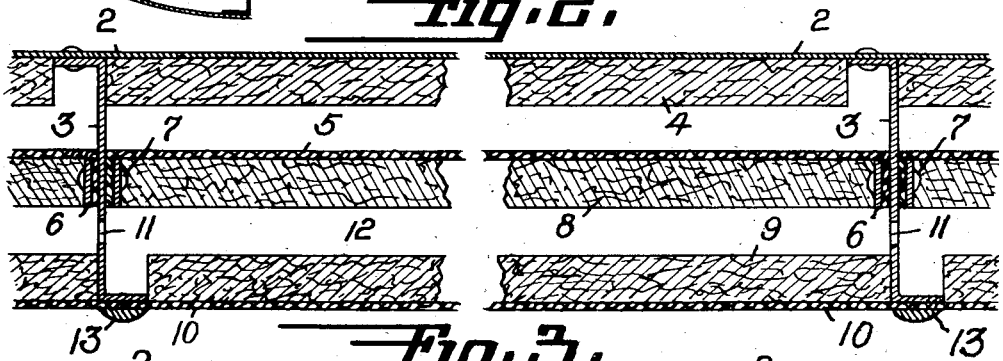
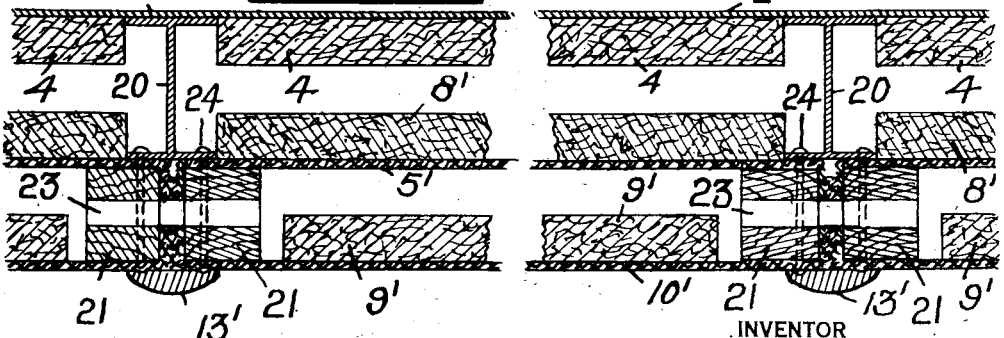
INVENTOR
CARL A. FRISCHE
BY
Herbert H. Thompson
HIS ATTORNEY.

Patented May 30, 1939

2,160,066

UNITED STATES PATENT OFFICE 2,160,066

SOUNDPROOFING CONSTRUCTION

Carl A. Frische, Leonia, N. J., assignor to Sperry Gyroscope Company, Inc., Brooklyn, N. Y., a corporation of New York Application November 16, 1935, Serial No. 50,100

12 Claims. (Cl. 20—4)

This invention relates generally to sound proofing or sound absorbing construction, and the invention has reference, more particularly, to a novel light weight sound proofing construction especially adapted for use on airplanes and other aircraft, although also adapted for general architectural work.

The noise present in airplane cabins results almost entirely from the operation of the airplane engines, i. e., propellers, etc., the frequency of such engine noise being almost entirely within the relatively low frequency range of 0 to 500 cycles per second, while the predominating and most disturbing noise frequencies are those between 100 and 200 cycles. Ordinary felt, such as kapok felt, as well as rigid sound absorbing materials have very little sound absorbing ability in the low range between 0 and 500 cycles and consequently but limited sound absorption can be obtained by using such materials alone, or by attaching such materials as, for example, felt to the outer or inner skins of the ship cabin. The felt so attached, however, serves to load and damp the outer and/or inner cabin fabric or skin and effects some sound absorption. However, owing to the extremely loose coupling of the inner and outer skins of an airplane cabin, felt layers on these skins do not appreciably help in the absorption of sound. Also, the inner and outer skins of the ship cabin are generally rigid or extremely tight or taut, the outer skin often being sheet metal and the inner skin tightly stretched doped fabric, whereby with such skins loaded with felt the effective sound absorbing frequency is relatively high, i. e., above 500 cycles, with the result that the efficiency of such sound insulation is very low within the noise range of 0 and 500 cycles.

The principal object of the present invention is to provide a novel sound proofing construction employing mutually spaced composite layers of sound absorbing material, said composite layers being fairly closely acoustically coupled, whereby the peaks or frequencies of maximum sound absorption of the two individual layers are greatly broadened, thereby producing effective sound absorption over the desired range of frequency from 0 to 500 cycles, the coupling of the two layers having the effect of rendering their absorption qualities additive so that by providing layers having their respective peaks of maximum sound absorption occurring at different frequencies, highly efficient sound absorption is attained.

Another object of the present invention lies in the provision of novel sound proofing construction that is extremely light in weight and which can be readily formed into units for easy installation in use as well as easy removal for purposes of inspection, the composite layers of sound absorbing material providing limited air space between the same for absorption of sound by multiple reflections.

Still another object of the present invention is to provide a novel sound proofing construction employing composite layers consisting of doped fabric loaded with felted material, one of said layers having its fabric relatively slightly stretched, whereas the other has its fabric relatively tightly stretched.

Other objects and advantages will become apparent from the specification, taken in connection with the accompanying drawing wherein the invention is embodied in concrete form.

In the drawing,

Fig. 1 is a schematic half sectional view of an airplane cabin provided with the novel sound proofing construction of this invention.

Fig. 2 is an enlarged fragmentary sectional view of a portion of the structure of Fig. 1.

Fig. 3 is a view similar to Fig. 2, but illustrates a somewhat modified form of the invention, and Fig. 4 is a diagram illustrating the sound absorbing action of the sound proofing construction.

Similar parts of the several figures of the drawing are similarly numbered.

Referring now to Figs. 1 and 2 of the drawing, the reference numeral 1 designates an airplane cabin equipped with the novel sound proofing construction of this invention. Cabin 1 is illustrated as having an outside skin 2 shown as of sheet metal, which skin is secured to the cabin frame members 3, illustrated as Z-bars. A layer 4 of light weight fibrous material is cemented directly to the inner surface of the metal skin 2 and extends between the successive frame members 3. The layer 4 may vary anywhere from approximately ½ inch to 2 inches in thickness, whereas the skin 2 is relatively thin and generally on the order of .025 inch. Layer 4 serves to dampen the skin 2 and greatly reduces the vibration of this skin, thereby reducing the radiation of sound into the cabin interior. The layer 4, preferably of kapok or "Seapak", is quite porous and consequently absorbs sound readily and, therefore, of itself aids in preventing the transmission of sound into the cabin.

Positioned inwardly of the layer 4 are panels or diaphragms 5 of doped fabric. The air space between layer 4 and each panel 5 is preferably of approximately the same width as that of the felt layer 4. This fabric may be a cambric or other material which has been coated with one or, preferably, two films of dope, such as a cellulose acetate lacquer. Only sufficient dope is applied to the fabric panels 5 to render the same airtight, as it is not desired to have these panels very taut, the same being merely taut enough to prevent the formation of slack therein. The fabric panels or diaphragms 5 are shown as secured, as by battens 6 and rivets 7, to the web portion of the frame members 3. A layer 8 of felted kapok or other suitable material, such as "Seapak", is cemented to the inner surface of the fabric panels 5. The layer 8 is preferably of the same material as layer 4 and of substantially the same thickness. Panels 5 loaded with layer 8 preferably have a natural sound frequency of between 60 and 100 cycles, this frequency being determined by the tautness of the fabric forming these panels, which tautness is determined, in turn, by the amount of dope applied to the fabric.

Spaced inwardly of the layer 8 is another felt or fibrous layer 9 of substantially the same thickness as layer 8. Layer 9 is secured, as by cementing, to the outer surface of the cabin inner skin 10, which latter is preferably doped fabric. The fabric or diaphragm 10 is preferably drawn quite taut, as by having applied thereto four films of dope, thereby giving the interior surface of the cabin a neat and attractive appearance, while at the same time providing a diaphragm that has a higher peak frequency than the fabric or diaphragm 5. The space 12 between felt layers 8 and 9 is preferably substantially equal to the thickness of one of the layers 8 or 9. The webs of the frame members 3 are provided with apertures 11 for providing communication between adjoining spaces 12 to thereby somewhat reduce and control the coupling effect between the composite layers 5, 8 and 9, 10. If desired, the cabin inner skin 10 may consist of a plurality of panels or doped sheets of fabric which are respectively attached at their edges to the members 3 and molding strips 13 may be used for concealing the lines of juncture of adjoining panels or diaphragms 10. Panels 10 loaded with layer 9 preferably have a natural sound frequency of between 400 and 500 cycles, such frequency being determined by the amount of dope applied to the fabric.

The operation of the novel sound-proof construction of this invention may be explained by reference to Fig. 4, showing a diagram illustrating the percentage of sound absorption with reference to the sound frequency in cycles per second. An ordinary layer of felt of thickness equal to one of the layers 4, 8, or 9 suspended as between frame members 3 and not cemented or attached to a doped fabric, would possess the sound absorbing capacity shown by curve 16 of Fig. 4. It will be noted that the sound absorbing capacity of such a layer of felt is extremely low between zero and 500 cycles, which covers the range of airplane noises. As shown by this graph, a layer of felted kapok would absorb merely 15% of the noise in the region of 400 cycles. The composite layer 5, 8, owing to the slight tautness of the fabric 5, will possess a maximum sound absorption peak at a relatively low frequency and tests have shown that by using two dope films on a panel 5 of ordinary size, the maximum sound absorption obtained with the layer 5, 8 occurs at approximately 60 cycles, and curve 17 illustrates the sound absorbing ability of this composite layer. Composite layer 9, 10 on the other hand, will have a higher sound absorption peak owing to the relatively great tautness of the fabric 10. Thus, by employing four films of dope, such as cellulose acetate, on fabric 10, the composite layer 9, 10 will have a peak of sound absorption at approximately 400 cycles and the sound absorbing capacity of this composite layer is illustrated by curve 18 in Fig. 4.

Owing to the fairly close coupling of composite layers 5, 8 and 9, 10, i. e., the air space 12 being substantially equal to the thickness of either of layers 8 or 9, these composite layers co-act jointly to produce a sound absorbing effect that is substantially equal to the summation of the sound absorbing effects of the respective composite layers. This is illustrated in Fig. 4, wherein the curve 19 illustrates the sound absorbing capacity of the composite layers acting jointly due to their coupling action. It will be noted that curve 19 shows that the conjoint action of both composite layers produces a sound absorbing means having an extremely high sound absorbing capacity in the range between zero and 500 cycles, thereby serving to effectively absorb the sounds ordinarily obtaining in an airplane cabin.

In the form of the invention shown in Fig. 3, the parts which are similar to those of Fig. 2 are similarly numbered. In this figure, the cabin frame members are illustrated as I-beams 20 and the outer skin 2 is shown as provided with the dampening felt layer 4, as previously described. In this form of the invention, however, the cooperating composite inner layers of sound absorbing material are shown as carried by removable frames 21 which ordinarily would be of rectangular shape. These frames may be of wood or other material and carry on their outer surfaces the doped fabric 5' corresponding to the fabric 5 of Fig. 2. Fabric 5' preferably extends over the peripheral edges of the frame 21 and is secured thereto as by cementing. The fabric 5' carries the felted insulating material 8' similar to layer 8. The inner skin of the cabin comprises fabric 10' that is similar to fabric 10, the fabric or panels 10' being also cemented preferably to the peripheral edges of frame 21 in overlying relation to the cemented portion of panels 5'. Fabric diaphragms or panels 10' are also loaded with felted material 9' similar to the material 9 of Fig. 2. The frames 21 are shown provided with transverse apertures 23 for reducing and controlling the coupling between composite layers 5', 8' and 9', 10'. Beading or molding 13' may be used for concealing the joints between adjacent panels. Thus, it will be noted that in Fig. 3 the two composite layers of insulating material are carried by the frame members 21 and may be mounted as units upon the cabin frame members 20, as by use of rivets or fasteners 24 and likewise these units may be removed from the frame members when desired for purposes of inspection.

The operation of the sound absorbing construction of Fig. 3 is similar to that of Fig. 2 and therefore would appear to require no further description.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. A sound proofing construction comprising a pair of mutually spaced co-acting composite layers acoustically coupled by a small air space between said layers, frame means for supporting said layers, each of said layers consisting of air-tight doped fabric loaded with felted material.

2. A sound proofing construction comprising a pair of acoustically coupled composite layers, a frame for supporting said layers in mutually spaced relation, each of said layers consisting of air-tight doped fabric loaded with felted material, the fabric of one of said layers being more tensely stretched than the other, whereby said one layer has a higher natural sound frequency than the other.

3. A sound proofing construction comprising mutually spaced composite layers, a frame for supporting said layers, the air volume between said composite layers being small, whereby a relatively large acoustic coupling is obtained between said layers, each of said layers comprising a stretched air-tight fabric having felted material adhered thereto, the fabric of one of said layers being stretched just sufficiently to eliminate slack and the fabric of the other of said layers being relatively tensely stretched.

4. A sound proofing construction comprising mutually spaced similar composite layers, the air space between said composite layers being substantially equal to the thickness of one of said layers, each of said layers comprising an air-tight doped fabric having felted material cemented thereto, the fabric of one of said layers having a greater number of coats of dope applied thereto than the other.

5. A sound proofing construction unit comprising a frame member, a double diaphragm carried by said frame member, the diaphragms of said double diaphragm being air-tight mutually spaced and acoustically coupled, one of said diaphragms having a sound resonance peak occurring at a higher frequency than the other, and means for loading said diaphragms.

6. A sound proofing construction unit comprising a frame member, a double diaphragm carried by said frame member, the diaphragms of said double diaphragm being mutually spaced and acoustically coupled, felted material attached to said diaphragms for loading the latter, said diaphragms being differentially stretched, whereby the frequencies of maximum sound absorption of said diaphragms differ.

7. A sound proofing construction unit comprising a frame member, a double diaphragm carried by said frame member, the diaphragms of said double diaphragm being mutually spaced and acoustically coupled, said frame member having apertures therethrough intermediate said diaphragms to limit the acoustic coupling of said diaphragms, and fibrous material attached to said diaphragms for loading the latter, said diaphragms being differentially stretched, whereby the frequencies of maximum sound absorption of said diaphragms differ.

8. A sound proofing construction for aircraft cabins having inner and outer skins, comprising a loading layer of fibrous material adhered to the inner surface of said cabin outer skin, a diaphragm interposed intermediate said skins and spaced therefrom, a loading layer of fibrous material adhered to said diaphragm, and a loading layer of fibrous material adhered to the outer surface of said cabin inner skin, the frequency of maximum sound absorption of the loaded inner skin of said cabin being appreciably higher than that of said loaded diaphragm.

9. A sound proofing construction comprising a pair of acoustically coupled composite layers, the air coupling between said layers being of approximately the same thickness as one of said layers, each of said layers consisting of air-tight doped fabric loaded with felted material, one of said composite layers having a natural sound frequency of between sixty and one hundred cycles and the other having a natural sound frequency of between four hundred and five hundred cycles.

10. In a sound proof construction for aircraft cabins having an outer skin and structural members for supporting said skin, removable frames carried by said structural members, inner and outer differentially stretched sheets carried by said frames, and layers of felted material attached to said sheets.

11. In a sound proof construction for aircraft cabins having an outer skin and structural members for supporting said skin, removable frames carried by said structural members, and composite sound insulation layers carried by said frames, each of said layers consisting of a stretched sheet loaded with a thickness of felted material, said layers being mutually spaced a distance substantially equal to the thickness of said felted material.

12. In a sound proof construction for aircraft cabins having an outer skin and structural members for supporting said skin, removable frames carried by said structural members, and compositite sound insulation layers carried by said frames, each of said layers consisting of a stretched sheet loaded with a thickness of felted material, said layers being mutually spaced a distance substantially equal to the thickness of said felted material, said frames having apertures therethrough for reducing and controlling the acoustic coupling between said composite layers.

CARL A. FRISCHE.